US010460303B2

(12) United States Patent
Patil et al.

(10) Patent No.: US 10,460,303 B2
(45) Date of Patent: Oct. 29, 2019

(54) LOSS PREVENTION IN SELF-SERVICE RETAIL CHECKOUT USING SMART ALARMS

(71) Applicant: Disney Enterprises, Inc., Burbank, CA (US)

(72) Inventors: Mangesh B. Patil, Winter Garden, FL (US); Megha Vyas, Troy, MI (US); John J. Keogh, Bothell, WA (US); Mihail A. Ambrozie, Orlando, FL (US); James N. Efstathiou, Kissimmee, FL (US); Mathew G. Adams, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 447 days.

(21) Appl. No.: 15/283,080

(22) Filed: Sep. 30, 2016

(65) Prior Publication Data

US 2018/0096331 A1 Apr. 5, 2018

(51) Int. Cl.
*G06Q 20/20* (2012.01)
*G07G 1/00* (2006.01)
*G08B 13/24* (2006.01)
*H04W 4/80* (2018.01)

(52) U.S. Cl.
CPC ............ *G06Q 20/208* (2013.01); *G07G 1/009* (2013.01); *G07G 1/0045* (2013.01); *G08B 13/246* (2013.01); *G06Q 20/203* (2013.01); *H04W 4/80* (2018.02)

(58) Field of Classification Search
CPC ... G06Q 20/208; G06Q 20/203; G08B 13/246
See application file for complete search history.

(56) References Cited

U.S. PATENT DOCUMENTS

| | | | |
|---|---|---|---|
| 7,620,568 B1 * | 11/2009 | Parker-Malchak | G06Q 10/087 235/375 |
| 2006/0175401 A1 * | 8/2006 | Roberts | G06Q 10/087 235/383 |
| 2009/0322537 A1 * | 12/2009 | Tapp | G08B 13/19697 340/572.4 |
| 2012/0193416 A1 * | 8/2012 | Smith | G06K 7/10554 235/440 |
| 2014/0091933 A1 * | 4/2014 | Mohiuddin | G06Q 20/32 340/572.1 |

(Continued)

*Primary Examiner* — A. Hunter Wilder
(74) *Attorney, Agent, or Firm* — Patterson + Sheridan, LLP

(57) ABSTRACT

Systems, methods, and articles of manufacture for performing an operation comprising receiving, from a self-checkout platform and as part of a purchase transaction for a first product, a data value of a barcode of the first product, storing an indication in a product store that the first product has been purchased, receiving a first item-specific identifier stored in a first radio frequency identification (RFID) tag associated with the first product, cross-referencing the first item-specific identifier with the indication in the product store to verify the purchase transaction of the first product via the self-checkout platform, receiving a second item-specific identifier stored in a second RFID tag associated with a second product, cross-referencing the product store to determine the second product has not been purchased via the self-checkout platform, and emitting a security notification related to the second product.

17 Claims, 10 Drawing Sheets

(56) References Cited

U.S. PATENT DOCUMENTS

2014/0316919 A1\* 10/2014 Li .......................... G06Q 30/06
705/23

\* cited by examiner

| ITEM DESCRIPTION (702) | BARCODE VALUE (703) | ITEM-SPECIFIC IDENTIFIER (704) | PURCHASED? (705) |
|---|---|---|---|
| COFFEE MUG | 123456789 | 123456789ABCDEFG | N |
| COFFEE MUG | 123456789 | 123456789ABCDEGG | N |
| COFFEE MUG | 123456789 | 123456789ABCDEAA | N |
| PENCIL | 222222222 | 222222222BBBBBBB | N |
| PENCIL | 333333333 | 333333333CCCCCCC | N |

FIG. 7A

| CUSTOMER ID (707) | BARCODE VALUE (708) |
|---|---|
| 123456 | 123456789 |
| 123456 | 123456789 |
| 654321 | 222222222 |

FIG. 7B

| CUSTOMER ID (710) | ITEM-SPECIFIC IDENTIFIER (711) |
|---|---|
| 123456 | 123456789ABCDEFG |
| 123456 | 123456789ABCDEGG |
| 123456 | 333333333CCCCCCC |
| 654321 | 222222222BBBBBBB |

| ITEM DESCRIPTION (702) | BARCODE VALUE (703) | ITEM-SPECIFIC IDENTIFIER (704) | PURCHASED? (705) |
|---|---|---|---|
| COFFEE MUG | 123456789 | 123456789ABCDEFG | Y |
| COFFEE MUG | 123456789 | 123456789ABCDEGG | Y |
| COFFEE MUG | 123456789 | 123456789ABCDEAA | N |
| PENCIL | 222222222 | 222222222BBBBBBBB | N |
| PENCIL | 333333333 | 333333333CCCCCCC | N |

706

| CUSTOMER ID (707) | BARCODE VALUE (708) |
|---|---|
| 123456 | 123456789 |
| 123456 | 123456789 |
| 654321 | 222222222 |

709

| CUSTOMER ID (710) | ITEM-SPECIFIC IDENTIFIER (711) |
|---|---|
| 123456 | 123456789ABCDEFG |
| 123456 | 123456789ABCDEGG |
| 123456 | 333333333CCCCCCCC |
| 654321 | 222222222BBBBBBBB |

FIG. 7D

LOSS PREVENTION IN SELF-SERVICE RETAIL CHECKOUT USING SMART ALARMS

BACKGROUND

Field of the Disclosure

Embodiments disclosed herein relate to enhanced security systems for retail environments. More specifically, embodiments disclosed herein provide loss prevention in self-service retail checkout using smart alarms.

Description of the Related Art

Conventionally, customers may purchase products in a retail store by selecting desired products, taking the selected products to a checkout lane, and interacting with a cashier to process the transaction. The cashier may scan the products presented by the user, and remove or deactivate any security means associated with the product (for example, removing a lock from the product). This process allows the customer to take the product out of the store. However, this process is time consuming, and leads to long lines during high-volume sales periods. Furthermore, as self-checkout systems become more prevalent, conventional loss-prevention approaches leave much to be desired, as customers must still interact with employees as part of the loss prevention process.

SUMMARY

In one embodiment, a method comprises receiving, from a self-checkout platform and as part of a purchase transaction for a first product, a data value of a barcode of the first product, storing an indication in a product store that the first product has been purchased, receiving a first item-specific identifier stored in a first radio frequency identification (RFID) tag associated with the first product, cross-referencing the first item-specific identifier with the indication in the product store to verify the purchase transaction of the first product via the self-checkout platform, receiving a second item-specific identifier stored in a second RFID tag associated with a second product, cross-referencing the product store to determine the second product has not been purchased via the self-checkout platform, and emitting a security notification related to the second product.

In another embodiment, a system comprises a processor and a memory storing a program which when executed by the processor performs an operation comprising receiving, from a self-checkout platform and as part of a purchase transaction for a first product, a data value of a barcode of the first product, storing an indication in a product store that the first product has been purchased, receiving a first item-specific identifier stored in a first radio frequency identification (RFID) tag associated with the first product, cross-referencing the first item-specific identifier with the indication in the product store to verify the purchase transaction of the first product via the self-checkout platform, receiving a second item-specific identifier stored in a second RFID tag associated with a second product, cross-referencing the product store to determine the second product has not been purchased via the self-checkout platform, and emitting a security notification related to the second product.

In another embodiment, a computer program product comprises a computer-readable storage medium, the computer-readable storage medium storing instructions which when executed by a processor, performs an operation comprising receiving, from a self-checkout platform and as part of a purchase transaction for a first product, a data value of a barcode of the first product, storing an indication in a product store that the first product has been purchased, receiving a first item-specific identifier stored in a first radio frequency identification (RFID) tag associated with the first product, cross-referencing the first item-specific identifier with the indication in the product store to verify the purchase transaction of the first product via the self-checkout platform, receiving a second item-specific identifier stored in a second RFID tag associated with a second product, cross-referencing the product store to determine the second product has not been purchased via the self-checkout platform, and emitting a security notification related to the second product.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 7A-7D depict example data structures used to provide loss prevention in self-service retail checkout using smart alarms, according to various embodiments.

DETAILED DESCRIPTION

Figure 1A:
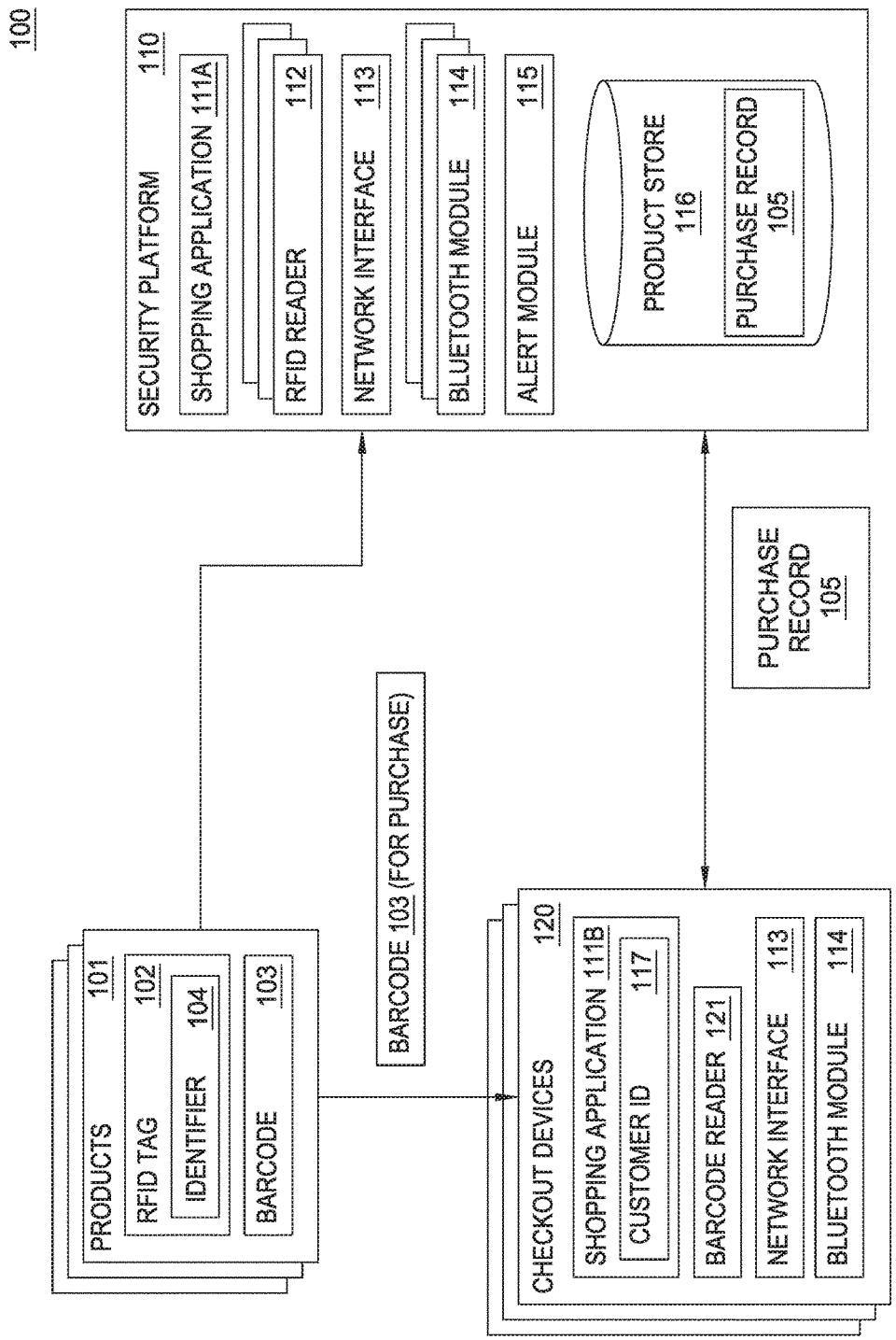
FIGS. 1A-1C are schematics illustrating systems which provide loss prevention in self-service retail checkout using smart alarms, according to various embodiments.

Embodiments disclosed herein provide loss prevention systems which do not require store employees to remove or deactivate security measures associated with products, such as RFID tags associated with the products. Instead, embodiments disclosed herein leverage mobile devices and other self-checkout solutions that allow the customer to scan the barcodes of products, pay for the products, and leave with the purchased items without having to interact with an employee for loss prevention screening.

Generally, embodiments disclosed herein leverage barcode and RFID technology. More specifically, products are assigned a barcode 103 and an RFID tag 102. The barcode 103 is an optical, machine-readable, representation of data. Example barcodes include Universal Product Code (UPC) barcodes, quick response (QR) codes, matrix codes, and the like. The barcode 103 may be unique on a product level, or on a per item level. The RFID tag 102 initially stores an identifier. In one embodiment, the barcode 103 and the identifier of the RFID tag for the corresponding product may be concatenated or otherwise used in combination to create an item-specific identifier 104. That item-specific identifier 104 is then written to the RFID tag 102. For example, if the data portion of a product's barcode 103 is 123456789, and an RFID tag 102 placed on the product stores an example identifier of ABCDEFG, the item-specific 104 identifier stored in the RFID tag may be "123456789ABCDEFG," or "ABCDEFG123456789". In at least one embodiment, the item-specific identifier is stored in a central data storage device in a record representing the product. The record may further reflect mappings between the item-specific identifier 104 of RFID tag 102 associated with the product 101 and the data portion of the barcode 103 of the product.

A customer subsequently purchases the product as part of a purchase transaction using a self-checkout system (e.g., via an application executing on a mobile computing device, or a self-checkout kiosk). In the self-checkout process, the customer scans the product's barcode. When the customer pays for the product, the self-checkout system transmits an indication to the central server that the product has been purchased. The indication includes the barcode of the product that was scanned by the mobile device. The central data storage device then updates a record for the product (which is associated with a unique customer identifier) to indicate that the product has been purchased. When the user subsequently leaves the store, an RFID reader reads the item-specific identifier stored in the product's RFID tag. The mobile device also transmits the unique customer identifier associated with the mobile device to a security platform. In at least one embodiment, the item-specific identifier is transmitted via Bluetooth®. A security platform then cross-references the central data storage device using the item-specific identifier of the RFID tag of the product to determine whether the purchase record associated with the customer identifier indicates that the product has been purchased, thereby verifying the purchase transaction of the product. In one embodiment, the purchase record for the purchase transaction includes an item-specific identifier for each product purchased by the customer. In such an embodiment, the absence of an item-specific identifier for a product indicates that the product has not been purchased.

In one embodiment, when the record indicates the product has been purchased, an alarm system is deactivated for this particular product. If, however, the record indicates the product has not been purchased, the system does not deactivate the alarm system for the product, and a security alert is generated (e.g., via the security system, a mobile device notification, email notification, and the like).

FIG. 1A is a schematic illustrating a system 100 which provides loss prevention in self-service retail checkout using smart alarms, according to one embodiment. As shown, the system 100 includes a plurality of products 101, a security platform 110, and a plurality of checkout devices 120.

The products 101 include any type of goods or items. As shown, each product 101 includes an RFID tag 102 and a barcode 103. The RFID tag 102 includes an item-specific identifier 104. The item-specific identifier 104 is a unique identifier specific to each product 101. In one embodiment, the item-specific identifier for a product is a string that includes a numerical portion of the barcode 103 and an RFID identifier stored in the tag 102. The barcode 103 is an optical machine-readable representation of data relating to the product 101 to which it is attached, where the data includes a numerical portion. The barcode 103 may be specific to a class of products 101 (e.g., size small blue shirts of a particular brand), or may be specific to each instance of a product (e.g., a barcode that is specific at the product or specific item level). Therefore, for example, each size small blue shirt of the particular brand would have an example barcode 103 which encodes an example data value of "999999999". As another example, a particular type of computer mouse has barcodes 103 that are specific at the item level. Therefore, in such an example, a first computer mouse would have an example barcode 103 which encodes an example data value of "111111111" while a second computer mouse of the same type would have an example barcode 103 that encodes an example data value of "111111112".

In at least one embodiment, a user defines the data space for the barcodes 103, the item-specific unique identifiers 104, or both. In doing so, the user may consider one or more of the number of products 101 sold by a manufacturer, the number of products sold by a retailer, a format of the data space of the barcode 103, a format of the data space of the item-specific identifiers 104, and the like. For example, if a retailer sells products requiring a large number of alphanumeric characters to encode barcode data values in the barcode 103, the user may allocate a greater number of alphanumeric characters of the item-specific identifiers 104 to the barcode 103, and reducing the number of alphanumeric characters of the RFID identifier used in creating the item-specific identifier 104. Therefore, continuing with the mouse example, if the RFID identifier of the RFID tag 102 associated with the mouse has a value of ABCDEFGHIJKL, and the maximum number of alphanumeric characters that can be stored in the RFID tag 102 as the item-specific identifier 104 is 16, the user may define the format for the item-specific identifier 104 as the entire data value of the barcode 103 (e.g., 9 alphanumeric characters) and the first (or last) 7 characters of the RFID identifier of the respective RFID tag 102. In such an example, the item-specific identifier 104 for the mouse having an example data value of 111111112 may be 111111112ABCDEFG, or 111111112FGHIJKL.

A user uses an encoder to program the item-specific identifier 104 in the RFID tag 102, and repeats this process for all products 101 sold in a retail store. Alternatively, RFID tags 102 may be programmed and applied to products 101 en masse before the products 101 are delivered to a retail location. RFID tags 102 may be implemented separately or integrated with labels bearing barcode 103 to meet the needs of a particular distribution and retail environment.

The security platform 110 includes a shopping application 111A, RFID readers 112, a network interface 113, a Bluetooth module 114, an alert module 115, and a product store 116. Generally, the shopping application 111 (which includes instances 111A and 111B) is a self-checkout platform configured to facilitate user-driven self-checkout transactions, and orchestrate security and loss prevention in the system 110. The RFID readers 112 are configured to read information stored in RFID tags 102, including the item-specific identifier 104. Multiple RFID readers 112 are positioned in a given location, such as at the entrances and exits of a retail store. The network interface 113 facilitates network communication between devices and applications in the system 100, such as the instance of the shopping application 111B on the checkout devices 120 and the instance of the shopping application 111A on the security platform 110. The Bluetooth module 114 is a Bluetooth® hardware device, however, other suitable near-range wireless communications interfaces that provide suitable bandwidth and range to support data communication between security platform 110 and checkout devices 120 may be used, such as NFC, Wi-Fi, and the like. In at least one embodiment, the Bluetooth module 114 is a Bluetooth Low Energy (BLE) module which can detect nearby Bluetooth-enabled devices. The alert module 115 is representative of any type of alarm system, notification system, security system, or loss prevention system. For example, when invoked, the alert module 115 triggers an audible and/or visual alarm, alert nearby employees, send notification emails or text messages, and the like.

The product store 116 stores information related to each of the products 101, including the barcode 103 of each product 101, the item-specific identifier 104 for each product 101, as well as an indication of whether the product 101 has been purchased as part of a purchase transaction. Generally, information about each product 101 can be populated in the product store 116 in a number of ways. For example, a manufacturer who programs the RFID tags 102 of each product 101 with an item-specific identifier 104 can provide each barcode 103 and item-specific identifier 104 to a purchaser when an order is placed (or at some point thereafter). The purchaser then stores the barcode 103 and item-specific identifier 104 in the product store 116 (which may occur before or after the purchaser receives the purchased products). As another example, when an employee who programs the item-specific identifier 104 in each product 101, the product store 116 is automatically updated to reflect the barcode 103 and item-specific identifier 104. When a customer purchases a product 101 as part of a purchase transaction, the purchase record 105 is updated to reflect the purchase. Subsequently, if a customer returns with a product 101 that was previously purchased, the security platform 110 reads the item-specific identifier 104. The security platform 110 then cross-references the product store 116 using the item-specific identifier 104 to determine that the product was in fact purchased. As such, the security platform 110 refrains from setting off an alarm, allowing customers to return to the store with previously purchased products 101. Alternatively, if a customer enters the store with a product 101 that the security platform 110 determines was not previously purchased, an alarm may be issued.

Checkout devices 120 include an instance of the shopping application 111B, a barcode reader 121, a network interface 113, and a Bluetooth module 114. Examples of checkout devices 120 include mobile devices, smartphones, tablet computers, e-readers, portable gaming consoles, laptop computers, kiosks, and dedicated hardware components that execute an instance of the shopping application 111B. The instance of the shopping application 111B on the checkout devices 120 allows users to purchase products 101, and includes or is able to access a customer ID 117. The customer ID 117 comprises a unique identifier associated with a user account. The customer ID 117 may be any universally unique ID (UUID), such as a hardware media access control (MAC) address of the Bluetooth module 114 or the network interface 113 or other value that is reliably associated with a particular user. In an exemplary operation a user scans a barcode 103 of one or more products 101 using the barcode reader 121. The barcode reader 121 may be a camera, laser, or any other software or hardware module capable of reading and interpreting an optical code such as a barcode 103. When the user has selected the items they wish to purchase as part of a purchase transaction, the user pays for their purchase via transaction processing processes (not shown) implemented by the shopping application 111B. The shopping application 111B then transmits an indication of products 101 purchased by the user to the instance of the shopping application 111A in the security platform 110 via the network interface 113 (or the Bluetooth module 114). The transmitted indication includes the decoded data values of barcodes 103 of products 101 scanned by the user and purchased as part of the purchase transaction. Information encoded in barcode 103 of a product 101 is read and decoded by the shopping application 111B on the checkout device 120. When the user purchases the product 101, the shopping application 111B generates a purchase record 105. The purchase record 105 includes the information from the barcode 103 of the product 101. The purchase record 105 may further include other details of the purchase, such as the customer ID 117 of the user purchasing the product 101, as well as time/date information, method of payment, and the like. In at least one embodiment, the purchase record 105 includes the item-specific identifier 104 of the RFID tag 102. As shown, the shopping application 111B then transmits the purchase record 105 to the security platform 110, which stores the record 105 in the product store 116. For example, the security platform 110 updates a record associated with the purchased product 101 and the data portion of the barcode 103 to indicate that the user has purchased the specific product. The security platform 110 may further store an indication of the customer ID 117, purchase details, and the like, in the product store 116.

When the user subsequently leaves the store, the user passes by one or more loss prevention checkpoints. The loss prevention checkpoints include an RFID reader 112, which can read the item-specific identifiers 104 of RFID tags 102 of the products possessed by a user. When a user uses their own (or a store-provided) mobile checkout device 120 to complete the purchase, instances of the shopping application 111B also communicates with these checkpoints via Bluetooth 114 or the network interface 113. For example, the instance of the shopping application 111B on the mobile device transmits an indication of the customer ID 117 via Bluetooth. The instance of the shopping application 111A then cross-references the product store 116 using the customer ID and the item-specific identifiers 104 to determine whether each product has been purchased.

In one embodiment, the instance of shopping application 111A determines that a product 101 has been purchased by determining whether a purchase record 105 includes the item-specific identifier 104 of the product 101. In such an embodiment, the lack of a purchase record 105 specifying that a product 101 having the item-specific identifier 104 indicates that the product has not been purchased, while the presence of a purchase record 105 specifying that the product 101 having the item-specific identifier 104 indicates that the product has been purchase. In another embodiment, metadata associated with each product 101 in the product store 116 reflects whether each product 101 has been purchased. When a customer purchases a product 101, the instance of the shopping application 111A updates the metadata for the product 101 in the product store 116 to reflect that the product 101 has been purchased. When the product store 116 indicates that the products associated with one or more item-specific identifiers 104 that have been read by the RFID readers 112 have not been purchased, the shopping application 111A triggers the alert module 115 to initiate a security response.

Figure 1B:
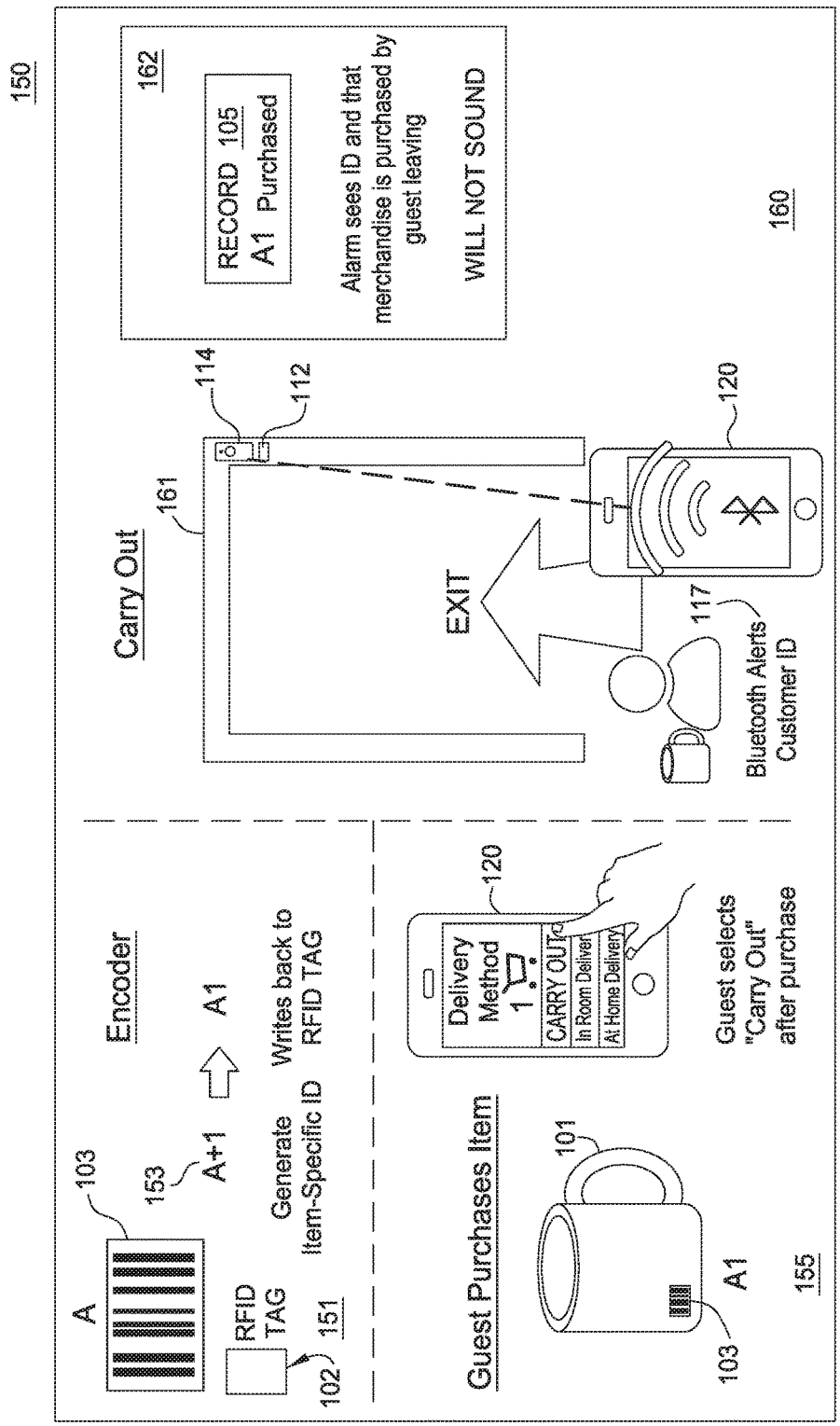

FIG. 1B is a schematic 150 depicting techniques used to provide loss prevention in self-service retail checkout using smart alarms. At 151, the data portion of a barcode 103 (represented by "A") of a product 101 and an RFID serial number 153 (represented by "1") of an RFID tag 102 are used to create an item-specific identifier 104 (represented by "A1"). The item-specific identifier 104 may be created by one or more of mathematically combining, concatenating, or hashing the numerical portion of the barcode 103 and the RFID serial number 153 of the RFID tag 102. The item-specific identifier 154 is written to the RFID tag 102 as the item-specific identifier 104. At 155, a user purchases a product 101 using an instance of the shopping application 111 executing on a device 120. The user purchases the product 101 by scanning the barcode 152 of the product 101. At 160, the user approaches an exit 161 that is configured with an RFID reader 112 and a Bluetooth module 114. As the user approaches the exit 161, the mobile device 120 detects the Bluetooth module 114 (or vice versa) and the mobile device 120 transmits the customer ID 117 of the shopping application 111B to the Bluetooth module 114. The RFID reader 112 reads the item-specific RFID identifier 154 of each product in the customer's possession. At 162, the security platform 110 receives the customer ID 117 and the item-specific identifier 154 and references the product store 116 to determine whether a purchase record 105 exists associating the item-specific identifier 154 to a product having the barcode 152. If the purchase record 105 indicates that the user purchased the item, an alarm is not triggered. However, if the RFID reader 112 reads the RFID tags of products that are in the customer's possession, but are not marked as being purchased in the product store 116, the security platform 110 invokes an alert via the alert module 115.

Figure 1C:
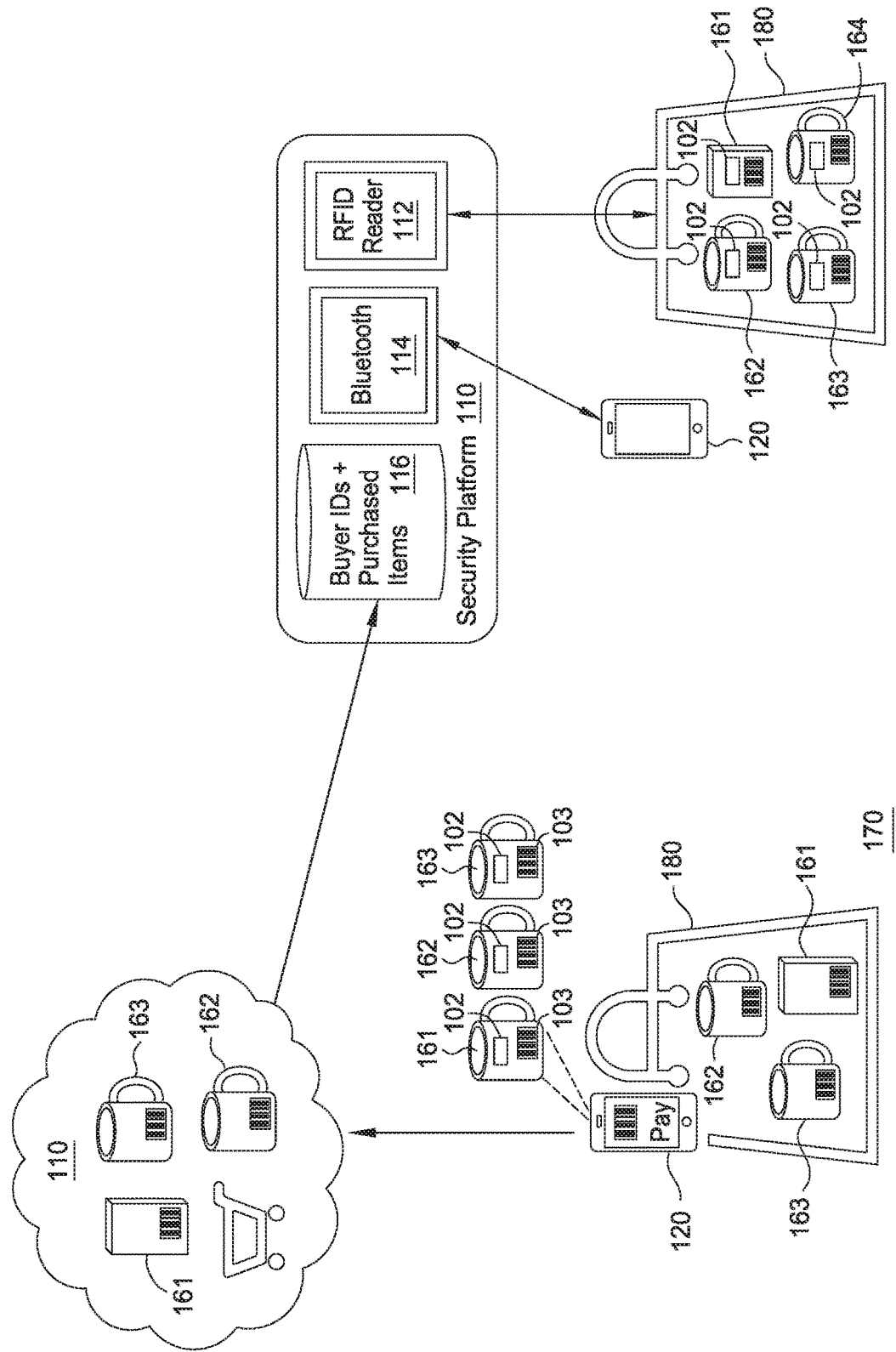

FIG. 1C is a schematic 170 depicting techniques used to provide loss prevention in self-service retail checkout using smart alarms. As shown a user of the shopping application 111B executing on a mobile device 120 scans and pays for a movie 161 and two coffee mugs 162, 163 which are illustratively placed in a shopping bag 180 carried by the user. In the embodiment shown in FIG. 1C, the shopping application 111B scans a respective barcode of movie 161 and the coffee mugs 162. The instance of the shopping application 111B executing on the mobile device 120 transmits an indication of the user's customer identifier 117 and values decoded from the barcodes 103 of the movie 161 and coffee mugs 162, 163 to the security platform 110. The security platform 110 then stores the received customer ID, barcode values, and a count of each item purchased in a purchase record 105 of the product store 116. Therefore, FIG. 1C illustrates an embodiment where the security platform 110 is unaware of the item-specific identifiers 104 of the RFID tags 102 of each product at the time the user completes the transaction on the mobile device 120. Instead, the security platform 110 is aware of what items were purchased (based on the barcodes), and a count of items purchased (e.g., one movie, and two coffee mugs).

When the user approaches an exit, a Bluetooth low energy (BLE) reader 114 reads the customer identifier 117 of Bluetooth module 114 of the mobile device 120. As shown, the RFID reader 112 of the security platform reads the identifiers 104 in the RFID tags 102 of each item possessed by the customer. As shown, the user's bag 180 includes the movie 161 and three coffee mugs 162-164. Therefore, the security platform 110 receives four item-specific identifiers 104, one for the movie 161, one for the coffee mug 162, one for the coffee mug 163, and one for the coffee mug 164. The security platform 110 then references the product store 116 to identify a purchase record 105 corresponding to the customer identifier 117. However, the security platform 110 correctly determines that the purchase record 105 indicates that the user having the associated customer ID 117 purchased one movie 161 and two coffee mugs (based on the barcodes and associated counts) 162-163, while there is no stored indication that the user purchased the third coffee mug 164. Due to this discrepancy in the count of the number of items purchased versus the number of items possessed by the customer (specifically the coffee mugs), the security platform 110 triggers an alarm to assist the customer to complete the purchase of mug 164.

The security platform 110 does not need to be aware of which two specific coffee mugs the customer purchased (e.g., coffee mugs 162, 163). Instead, the security platform 110 knows that the customer purchased two coffee mugs, and that the coffee mugs have the same barcode. However, by reading all RFID tags on each product possessed by the customer, the security platform is able to identify specific instances of items. The security platform 110 then determines, for each type of item, a count of items possessed by the customer. The security platform 110 then compares the item counts to the item types and corresponding counts stored in the purchase record 105 of the product store 116.

Figure 2:
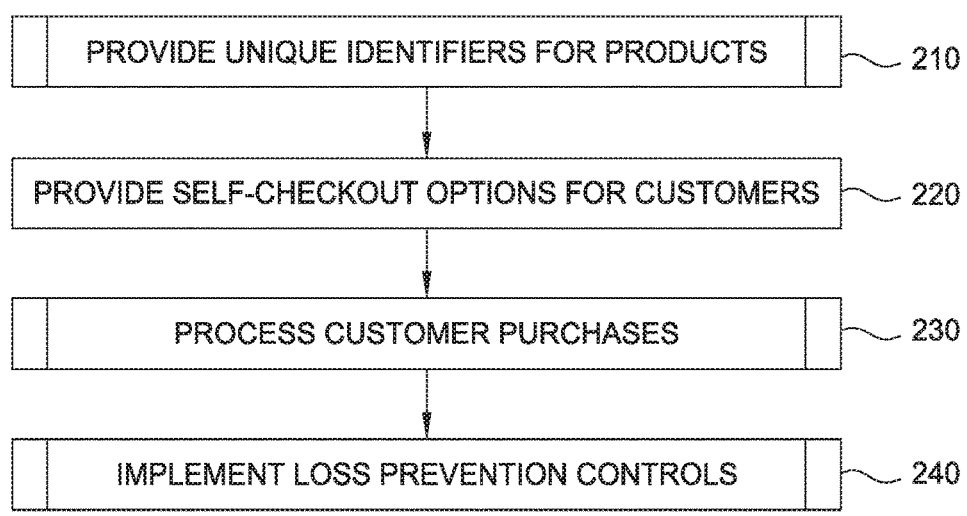
FIG. 2 is a flow chart illustrating a method to provide loss prevention in self-service retail checkout using smart alarms, according to one embodiment.

FIG. 2 is a flow chart illustrating a method 200 to provide loss prevention in self-service retail checkout using smart alarms, according to one embodiment. At 210 item-specific identifiers 104 are provided for one or more products sold by a retailer. The item-specific identifiers 104 are written to a respective RFID tag 102 associated with each product (e.g., placed on the product or affixed to the product). In one embodiment, the item-specific identifiers 104 comprise a concatenation of a data portion of the barcode of the product and a value of an identifier stored in the RFID tag 102. In one embodiment, the data portion of the barcode 103 is specific to each instance of a product 101 (e.g., each coffee mug depicted in FIG. 1B has a unique barcode). In such embodiments, the data portion of the barcode 103 is stored as the item-specific identifier 104 in the RFID tag 102 without needing to concatenate the data portion of the barcode 103 with the value of the identifier stored in the RFID tag 102. In one embodiment, the data portion of the barcode 103 is formatted according to a predefined data format sufficient to provide unique barcode data values for each product 101. The uniqueness of the data values of the barcodes 103 may be relative to a manufacturer, retailer, product type, and the like.

At 220, self-checkout options, such as mobile checkout applications and self-checkout stations or kiosks are provided to customers. At bock 230, customer purchases are processed. Processing customer purchases includes transmitting an indication of the item-specific identifiers of all products purchased by the customer. At 240, loss prevention controls are implemented to ensure that only the items paid for by customers are taken from the store. For example, an RFID reader 112 detects an item-specific identifier of a product 101. The shopping application 111B references the product store 116 with the item-specific identifier 104. The product store 116 may not include a purchase record 105 that specifies item-specific identifier 104 of the product 101. As such, the shopping application 111B determines that the product 101 associated with the item-specific identifier 104 has not been purchased, and invoke the alert module 115 to trigger an alarm or other security notification. If, however, the product store 116 includes a purchase record 105 specifying the item-specific identifier 104, the shopping application 111B determines that the product 101 associated with the item-specific identifier 104 has been purchased. As such, no alerts are triggered, and the customer can leave the store without going through a loss prevention checkpoint where an employee has to remove and/or deactivate the RFID tag 102.

Figure 3:
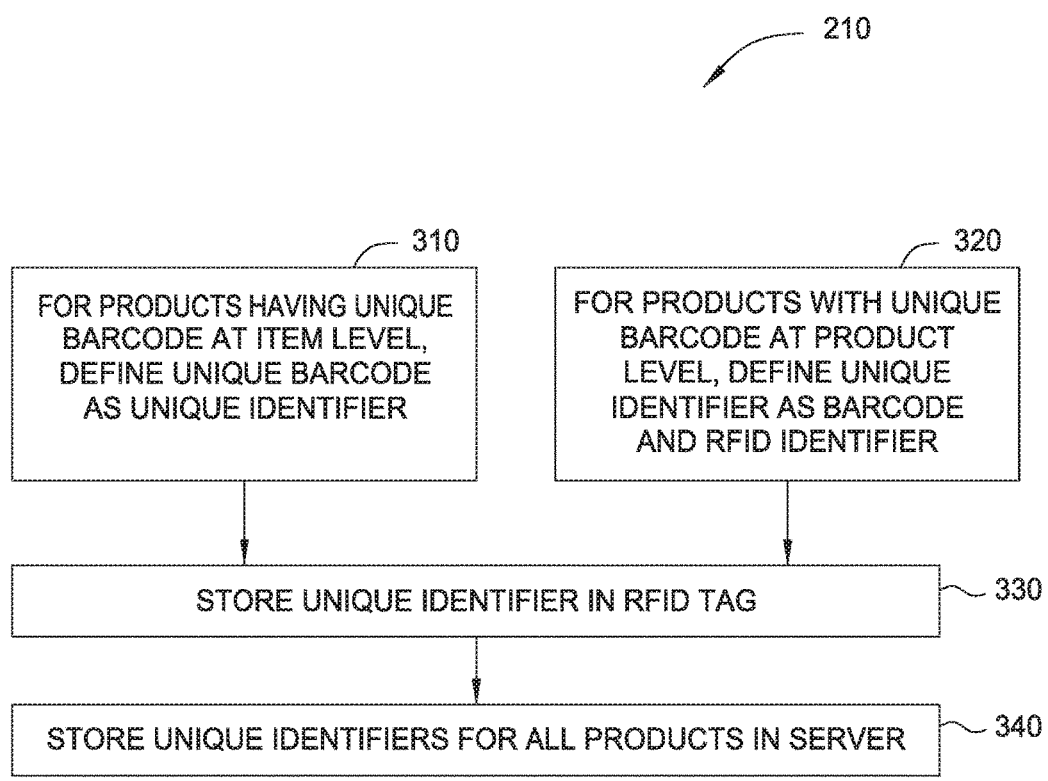
FIG. 3 is a flow chart illustrating a method to provide unique identifiers for products, according to one embodiment.

FIG. 3 is a flow chart illustrating a method 210 in greater detail to provide item-specific identifiers for products. Initially, a determination is made to invoke 310 or 320. The determination is made based on the type of barcode 103 desired in a given implementation. However, 310 and/or 320 may be executed serially when both types of barcodes 103 are used in a given implementation. Similarly, one or the other of 310 and 320 may be omitted if it is known that only a particular type of barcode 103 is used in a given implementation. At 310, a barcode of a product is defined as the item-specific identifier for products having an item-specific barcode at the item level. For example, the coffee mug depicted in FIG. 1B may have an item-specific barcode, while other coffee mugs (while otherwise identical) have different barcodes 103. Each of the hundreds or thousands of products 101 in a store would therefore bear a unique barcode 103. Since the barcodes 103 (and their encoded data values) are specific to each coffee mug, these barcodes 103 may be used as the item-specific identifier for each coffee mug. Generally, the data portion of the barcode 103 may include any number of alphanumeric characters. In one embodiment, a user defines the data space for the item-specific unique identifiers 104.

At 320, a concatenation of the data portion of the barcode 103 and item-specific identifier 104 stored in the RFID tag 102 associated with the product are defined as the item-specific identifier 104 for products 102 having a unique barcode 103 at the product level. In such embodiments, several items may have the same barcode 103, therefore, the data portion of the barcode 103 is not unique enough to distinguish between two otherwise identical items. For example, the coffee mug of FIG. 1A may have the same barcode 103 as thousands of other coffee mugs. In such examples, the item-specific identifier for each coffee mug may be some combination of the numerical portion of the barcode and the RFID identifier stored in the RFID tag 102 of each coffee mug. Alternatively, the item-specific identifier 104 may be the unique RFID identifier stored in each respective RFID tag 102. At 330, the item-specific identifier 104 is stored in the RFID tag. At 340, the item-specific identifiers 104 generated for each product are stored in the product store 116 along with an indication of the barcode value, facilitating the loss prevention techniques described herein.

Figure 4:
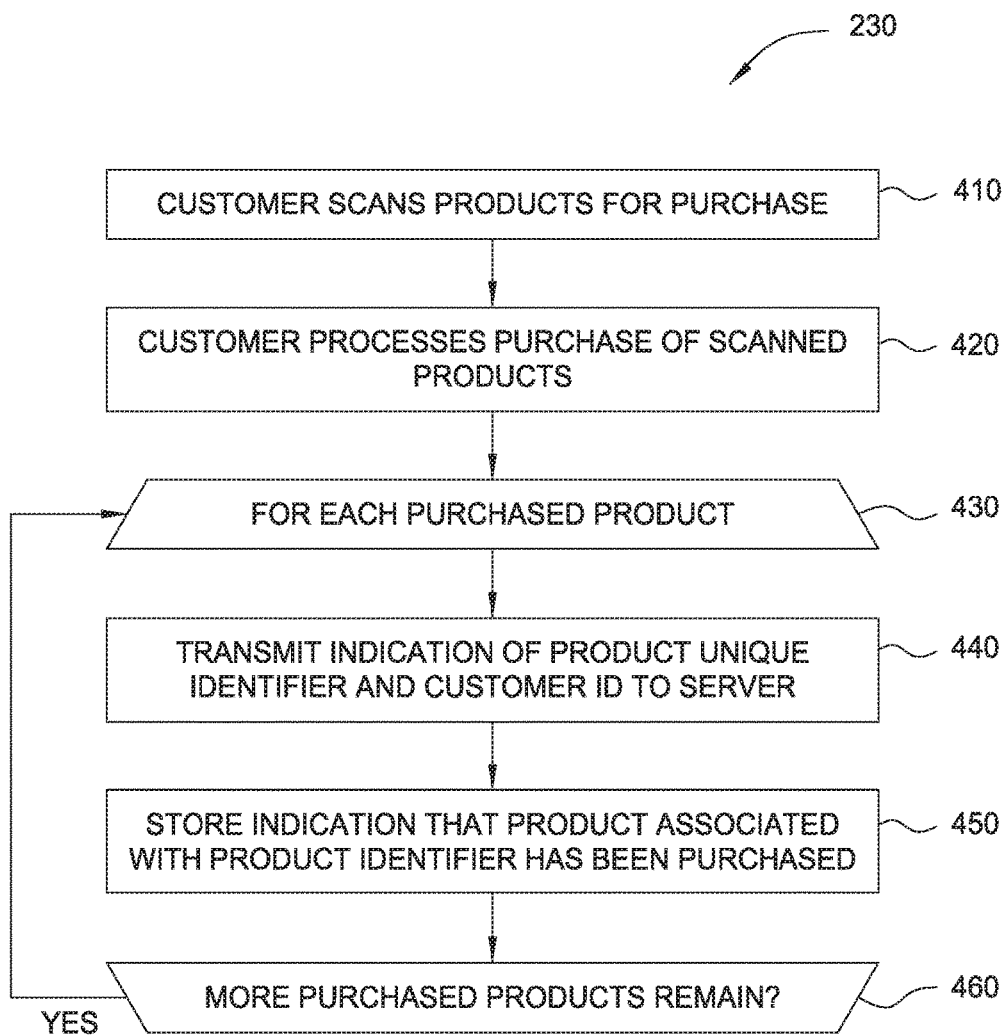
FIG. 4 is a flow chart illustrating a method to process customer purchases, according to one embodiment.

FIG. 4 is a flow chart illustrating a method 230 to process customer purchases in greater detail. At 410, a customer scans one or more products for purchase using a self-checkout system (such as an instance of the shopping application 111B executing on a device 120). In one embodiment, the customer may use a camera (or other barcode reading module) of a device 120 to scan a barcode 103. At 420, the customer process the purchase of scanned products by paying for all the items scanned at 410. At 430, the shopping application 111B executes a loop including 440-450 for each product scanned at 410. At 440, the shopping application 111B on the mobile device 120 may transmit an indication of the product's barcode 103 and the customer ID 117 to the instance of the shopping application 111A on the security platform 110. At 450, the instance of the shopping application 111A on the security platform 110 stores an indication in the product store 116 that the product associated with the barcode 103 (and optionally the item-specific identifier 104) has been purchased by the customer having the customer ID 117. The shopping application 111A may further store additional metadata related to the purchase, such as the time of purchase, method of payment, quantities of items purchased, and the like. At 460, the shopping application 111B determines whether more purchased products remain. While more purchased products remain, the shopping application 111B returns to 430.

Figure 5:
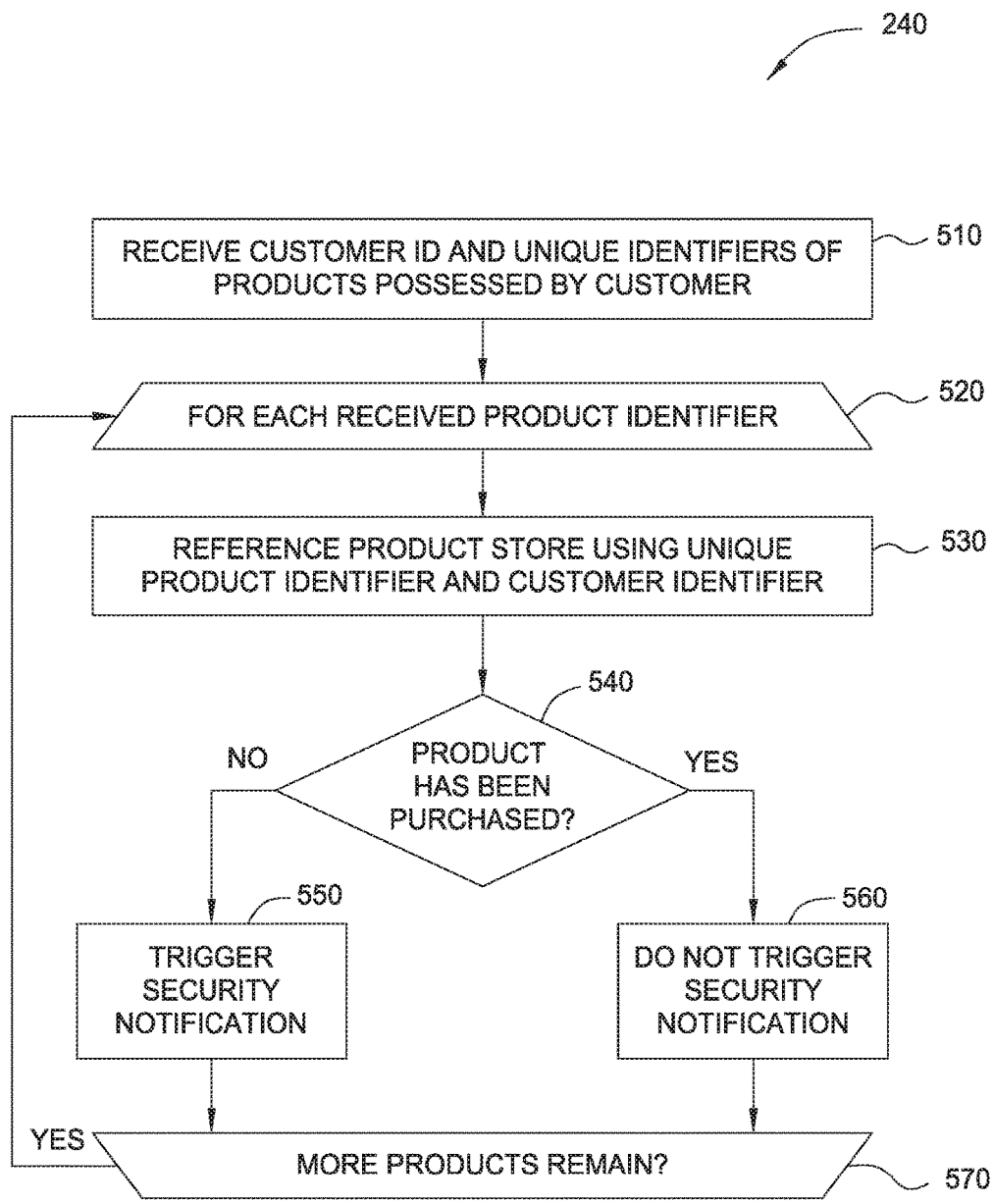
FIG. 5 is a flow chart illustrating a method to implement security controls, according to one embodiment.

FIG. 5 is a flow chart illustrating a method 240 to implement security controls in greater detail. Generally, the method 240 may be implemented by the security platform 110 as a customer is exiting a store, or in some other predefined location where loss prevention techniques are implemented. At 510 the shopping application 111A receives the customer ID 117 from an instance of the shopping application 111B. In at least one embodiment, the shopping application 111B provides the customer ID 117 via a Bluetooth or other wireless interface. In some embodiments, the RFID readers 112 at the exit scan the item-specific identifiers 104 in the RFID tags 102 of each product possessed by the customer. At 520, the instance of the shopping application 111A executing on the security platform executes a loop including 530-560 for each item-specific identifier 104 received from the RFID readers 112. At 530, the shopping application 111A references the product store 116 using the item-specific identifier 104 of the current product. At 540, the shopping application 111 determines whether the product store 116 indicates that the product has been purchased. For example, the shopping application 111A may reference the product store 116 to determine whether a record associated with the item-specific identifier 104, the product barcode 103, and the customer identifier 117 indicates a purchase of the product has been completed. If the product store 116 indicates the product has been purchased, the shopping application 111A proceeds to 560, where a security notification is not triggered. If, however, the shopping application 111A determines that the product store 116 indicates that the product has not been purchased, the shopping application 111A proceeds to 550, where a security notification (such as the sounding of an alarm) is triggered.

In some embodiments, the purchase record 105 does not include an indication of the item-specific identifier 104 of each product purchased by the customer. In such embodiments, the shopping application 111A may translate the received item-specific identifiers 104 into a corresponding barcode 103 based on the data in the product store 116. Based on this information, the shopping application 111A may determine whether a count of the number of products scanned by the RFID reader 112 matches a number of products purchased in the purchase record 105 associated with the customer identifier 117. For example, the shopping application 111A determines that the RFID reader 112 read RFID tags of three coffee mugs at the exit, while the purchase record 105 reflects that only two coffee mugs were purchased. Based on this discrepancy, the shopping application 111A may determine that at least one item has not been purchased, and trigger a notification at 550. At 570, the shopping application 111A determines whether more products remain. While more products remain, the shopping application 111A returns to 520.

Figure 6:
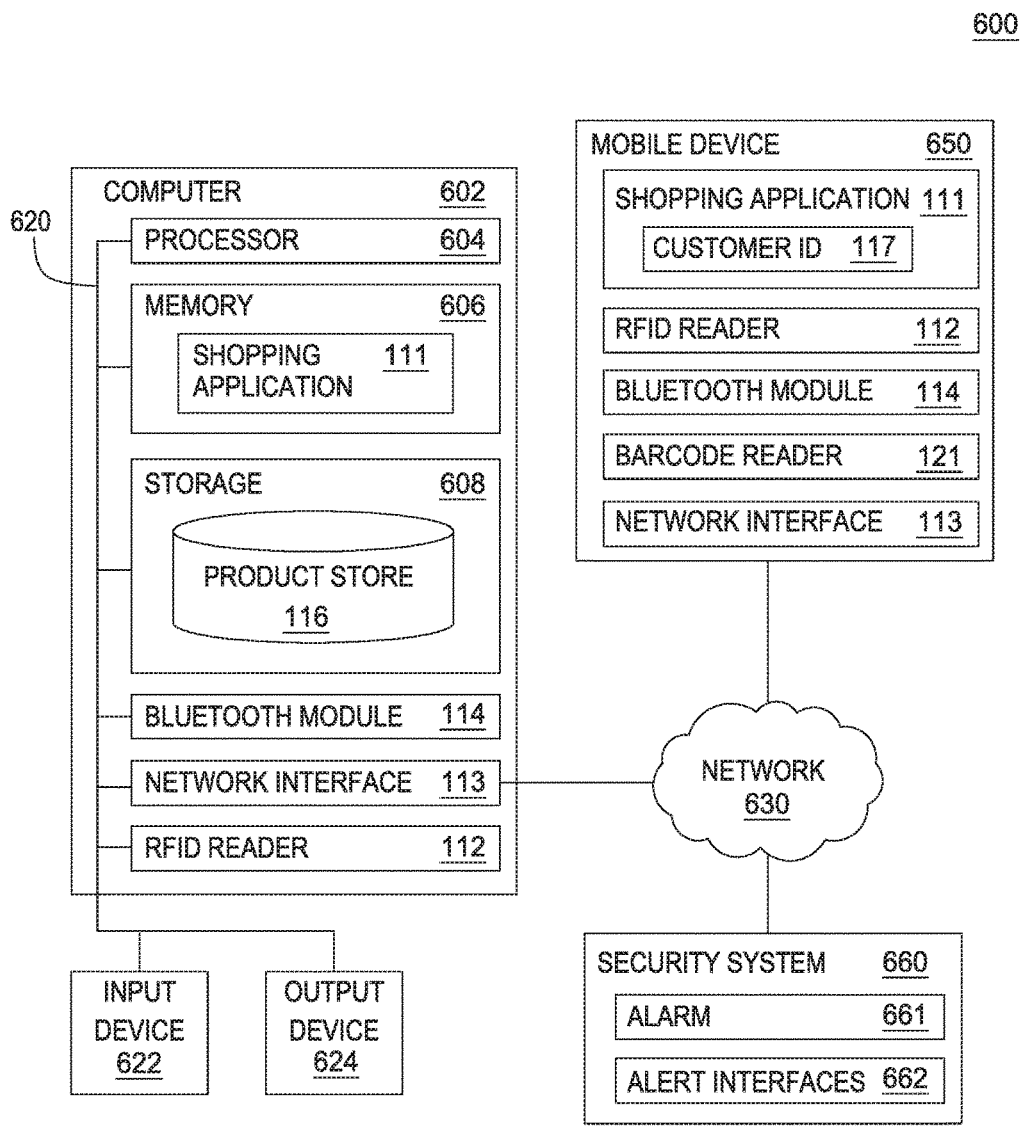
FIG. 6 is a block diagram illustrating a system which provides loss prevention in self-service retail checkout using smart alarms, according to one embodiment.

FIG. 6 is a block diagram illustrating a system which provides loss prevention in self-service retail checkout using smart alarms, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet. In at least one embodiment, the computer 602 may implement the security platform 110 of FIG. 1A.

The computer 602 generally includes a processor 604 which obtains instructions and data via a bus 620 from a memory 606 and/or a storage 608. The computer 602 may also include one or more RFID readers 112, one or more network interface devices 113, Bluetooth module 114, input devices 622, and output devices 624 connected to the bus 620. The computer 602 is generally under the control of an operating system (not shown). Examples of operating systems include the UNIX® operating system, versions of the Microsoft® Windows® operating system, and distributions of the Linux® operating system. (UNIX is a registered trademark of The Open Group in the United States and other countries. Microsoft and Windows are trademarks of Microsoft Corporation in the United States and other countries. Linux is a registered trademark of Linus Torvalds in the United States and other countries.) More generally, any operating system supporting the functions disclosed herein may be used. The processor 604 is a programmable logic device that performs instruction, logic, and mathematical processing, and may be implemented by one or more CPUs. The network interface device 113 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

The memory 606 contains the shopping application 111, which provides enhanced loss prevention techniques based on the item-specific identifiers stored in the RFID tags associated with a product. The storage 608 includes the product store 116, which includes information regarding a plurality of products. The product store 116 may include an indication of the barcode 103 and/or the item-specific identifiers 104 associated with each product (and stored in the RFID tags associated with each product). The product store 116 may also include an indication as to whether each specific product has been purchased. In addition, in some embodiments, the product store 116 includes an indication of the customer ID 117 associated with the purchase of a given product.

The system 600 includes mobile devices 650, which may be used by customers to process self-checkout purchases. The mobile device 650 generally includes a processor and memory (both not pictured). The mobile device 650 further includes the shopping application 111, which includes a unique customer ID 117, an RFID reader 112, a Bluetooth module 113, a network interface 113, and a barcode reader 121, all described in greater detail above. The system 600 further includes a security system 660, which may be any type of security or loss prevention platform. The security system includes an alarm 661, which may include any types of sounds, lights, or other alarms. The alert interfaces 662 include email alerts, text message alerts, and the like.

FIG. 7A depicts an example data structure 701 which contains information describing a plurality of products 101, according to one embodiment. In at least one embodiment, the data structure 701 is a database table stored in the product store 116. The data structure 701 includes four example data columns, namely an item description column 702, a barcode value column 703, an item-specific identifier column 704, and a purchase column 705. The item description column 702 stores a description for each product 101. The barcode value column 703 stores a data value encoded in a barcode 103 associated with the product. The item-specific identifier column 704 stores the item-specific identifier 104 encoded in the RFID tag 102 of each product 101, which is based on the barcode data value and an RFID identifier that identifies the RFID tag 102. The purchased column 705 stores an indication as to whether the product 101 has been purchased. In one embodiment, as products 101 are added to the data structure 701, the values in the purchased column 705 are set to reflect that the products 101 have not been purchased. Therefore, one example product in the table 701 is a coffee mug having a barcode 103 which encodes a data value of 123456789, and an item-specific identifier 104 of 123456789ABCDEFG. The example item-specific identifier 104 is therefore generated by concatenating the data value of the barcode (e.g., 123456789) and the RFID identifier of the RFID tag 102 (e.g., ABCDEFG).

FIG. 7B depicts an example data structure 706 which contains information describing purchases made by customers using the checkout application 111B, according to one embodiment. In at least one embodiment, the data structure 706 is a database table stored in the product store 116 (e.g., one or more purchase records 105). As customers process purchases with the checkout application 111B, the checkout application 111B transmits data to the security platform 110, which populates the data structure 706 with appropriate data values. The data structure 706 includes a customer ID column 707 and a barcode value column 708. The customer ID column 707 stores the customer ID 117 of the customer making a purchase. The barcode value column 708 stores the decoded data value from the barcode 103 associated with a purchased product 101. Therefore, one example row of data in the data structure 706 reflects that a customer ID 117 of 123456 scanned and purchased a product 101 having a barcode 103 encoding a data value of 123456789.

FIG. 7C depicts an example data structure 709 which contains information gathered by the security platform 110. Specifically, the data structure 709 includes a customer ID column 710 and an item-specific identifier column 711. The customer ID column 710 reflects a value of a customer ID 117 associated with an instance of the checkout application 111B executing on a mobile device 120. In at least one embodiment, the Bluetooth module 114 of the security platform 110 detects the customer ID 117 from the mobile device 120. The item-specific identifier column 711 reflects all item-specific identifiers 104 read by the RFID reader 112 when in proximity of the RFID reader 112. Therefore, for example, the data structure 709 reflects that the Bluetooth module 114 identified the customer ID 117 of 123456, while the RFID reader 112 detected the item-specific identifiers 104 of three different products possessed by the same customer.

FIG. 7D reflects the data structures 701, 706, and 709. The security platform 110 has updated the data structure 701 to reflect that the coffee mugs having the item-specific identifiers 104 of 123456789ABCDEFG and 123456789ABC-DEGG have been purchased. In one embodiment, the security platform 110 updates the data structure 701 responsive to updates to the data structure 709 (e.g., as a customer nears an exit to a store, and the RFID reader 112 reads the item-specific identifiers 104 of each product possessed by the customer).

For example, when identifying the entry in the table 709 indicating that the item-specific identifier 104 of 123456789ABCDEFG has been read by the RFID reader 112, the security platform 110 cross-references the data structure 707 with the associated customer ID 117 (e.g., 123456). In response, the security platform 110 determines that the customer having the customer ID 117 of 123456 purchased two items having the barcode 103 with an encoded data value of 123456789. The security platform 110 then cross-references the data structure 701 with the identified data values of the barcodes 103 and the item-specific identifiers 104 from the data structure 709. The security platform 110 then determines that the associated coffee mugs were purchased based on a match between the encoded values of the barcodes 103 and the item-specific identifiers 104. In response, the security platform 110 updates the purchased column 705 to reflect that the two coffee mugs have been purchased. As such, the security platform 110 does not generate an alarm based on the detected item-specific identifiers 104 of 123456789ABCDEFG and 123456789ABCDEGG (when the customer exits the store, or subsequently returns with the same products).

However, as shown, data structure 709 reflects that the RFID reader 112 read the RFID tag 102 of a product 101 having the item-specific identifier 104 of 333333333CCCCCCC in the possession of the customer with customer ID 117 of 123456, as determined by the Bluetooth module 114. In one embodiment, the security platform 110 determines a count of the products 101 possessed by the customer with the customer ID 117 of 123456, e.g., three products in this example. In this embodiment, the security platform references the data structure 706 to determine a count of products 101 purchased by the customer with the customer ID 117 of 123456, e.g., two products in this example. Because the customer having the customer ID 117 of 123456 is in possession of three products, but only paid for two, the security platform 110 refrains from updating the record associated with item-specific identifier 104 of 333333333CCCCCCC in the data structure 701, and emit an alarm notification.

In another embodiment, the security platform 110 deconstructs the item-specific identifier 104 in the data structure 711 to determine whether the product was purchased. Because the item-specific identifier 104 includes the encoded value of the barcode 103, the security platform 110 identifies the data value 333333333 of the barcode 103 in the item-specific identifier 104 of 333333333CCCCCCC. The security platform 110 then cross-references the data structure 706 with the value of 333333333, and determine that no records for this barcode value exist in the data structure 706. As such, the security platform 110 determines that the product 101 has not been purchased as part of a purchase transaction, and emits an alarm notification.

Advantageously, embodiments disclosed herein allow customers to complete purchases independently, while maintaining a secure shopping environment for retailers by keeping a listing of item-specific product identifiers stored in RFID tags associated with each of a plurality of products when those products have been purchased. When the item-specific product identifiers are stored in the product store 116, they continue to indicate that the associated product has not been purchased until a customer purchases the product, at which point the listing is modified to reflect the purchase. Doing so allows for faster checkouts for customers while reducing long lines that may build up in checkout lanes and loss prevention areas.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. In the context of this document, a computer readable storage medium may be any tangible medium that can contain, or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    as part of a first purchase transaction for a first grouping of products:
        receiving, from a self-checkout platform executed on a mobile device associated with a unique customer identifier, while the mobile device is in a store, data values of one or more barcodes of the first grouping of products;
        storing at least one indication in a data store that the first grouping of products has been purchased; and
        storing, in association with the at least one indication in the data store, a first count of the first grouping of products;
    receiving, from an RFID reader proximate to an entrance or exit of the store, a first set of item-specific identifiers stored in a first set of radio frequency identification (RFID) tags associated with the first grouping of products;
    determining a second count for the first set of item-specific identifiers;
    cross-referencing the first set of item-specific identifiers and the determined second count with the at least one indication and the first count stored in the data store to attempt to verify the first purchase transaction of the first grouping of products via the self-checkout platform, wherein cross-referencing further comprises determining whether the first set of item-specific identifiers are associated with a respective indication specifying that the first grouping of products have been purchased by the customer associated with a unique customer identifier, wherein the unique customer identifier is associated with the mobile device; and
    upon determining that the second count does not match the first count, generating a security notification related to the first grouping of products.

2. The method of claim 1, wherein the first set of item-specific identifiers comprises a concatenation of: (i) data values of one or more barcodes of the first grouping of products, and (ii) values of the first set of item-specific identifiers stored in the first set of RFID tags associated with the first grouping of products.

3. The method of claim 2, further comprising:
    deconstructing the first set of item-specific identifiers to identify the data values of one or more barcodes of the first grouping of products and the values of the first set of item-specific identifiers stored in the first set of RFC tags associated with the first grouping of products.

4. The method of claim 3, wherein the security notification is generated while the first set of RFD tags is active and without having to remove and disable the first set of RFID tags subsequent to the first purchase transaction of the first grouping of products.

5. The method of claim 1, further comprising prior to receiving the first set of item-specific identifiers:
    associating the first set of RFID tags with the first grouping of products;
    storing the first set of item-specific identifiers of the first grouping of products in the first set of RFID tags; and
    storing an indication in the data store that the first grouping of products has not been purchased.

6. A computer program product, comprising:
    a computer-readable storage medium having computer-readable program code embodied therewith, the computer-readable program code executable by a processor to perform an operation comprising:
        as part of a first purchase transaction for a first grouping of products:
            receiving, from a self-checkout platform executed on a mobile device associated with a unique customer identifier, while the mobile device is in a store, data values of one or more barcodes of the first grouping of products;
            storing at least one indication in a data store that the first grouping of products has been purchased; and
            storing, in association with the at least one indication in the data store, a first count of the first grouping of products;
        receiving, from an RFID reader proximate to an entrance or exit of the store, a first set of item-specific identifiers stored in a first set of radio frequency identification (RFID) tags associated with the first grouping of products;
        determining a second count for the first set of item-specific identifiers;
        cross-referencing the first set of item-specific identifiers and the determined second count with the at least one indication and the first count stored in the data store to attempt to verify the first purchase transaction of the first grouping of products via the self-checkout platform, wherein cross-referencing further comprises determining whether the first set of item-specific identifiers are associated with a respective indication specifying that the first grouping of products have been purchased by the customer associated with a unique customer identifier, wherein the unique customer identifier is associated with the mobile device; and
        upon determining that the second count does not match the first count, generating a security notification related to the first grouping of products.

7. The computer program product of claim 6, wherein the first set of item-specific identifiers comprises a concatenation of: (i) data values of one or more barcodes of the first grouping of products, and (ii) values of the first set of item-specific identifiers stored in the first set of RFID tags associated with the first grouping of products.

8. The computer program product of claim 7, the operation further comprising:
    deconstructing the first set of item-specific identifiers to identify the data values of one or more barcodes of the first grouping of products and the values of the first set of item-specific identifiers stored in the first set of RFID tags associated with the first grouping of products.

9. The computer program product of claim 8,
    wherein the security notification is generated while the first set of RFID tags is active and without having to remove and disable the first set of RFID tags subsequent to the first purchase transaction of the first grouping of products.

10. The computer program product of claim 6, the operation further comprising prior to receiving the first set of item-specific identifiers:
associating the first set of RFID tags with the first grouping of products;
storing the first set of item-specific identifiers of the first grouping of products in the first set of RFID tags; and
storing an indication in the data store that the first grouping of products has not been purchased.

11. A system, comprising:
a processor; and
a memory containing a program, which when executed by the processor, performs an operation comprising:
as part of a first purchase transaction for a first grouping of products:
receiving, from a self-checkout platform executed on a mobile device associated with a unique customer identifier while the mobile device is in a store, data values of one or more barcodes of the first grouping of products;
storing at least one indication in a data store that the first grouping of products has been purchased; and
storing, in association with the at least one indication in the data store, a first count of the first grouping of products;
receiving, from an RFID reader proximate to an entrance or exit of the store, a first set of item-specific identifiers stored in a first set of radio frequency identification (RFID) tags associated with the first grouping of products;
determining a second count for the first set of item-specific identifiers;
cross-referencing the first set of item-specific identifiers and the determined second count with the at least one indication and the first count stored in the data store to attempt to verify the first purchase transaction of the first grouping of products via the self-checkout platform, wherein the cross-referencing further comprises determining whether the first set of item-specific identifiers are associated with a respective indication specifying that the first grouping of products have been purchased by the customer associated with a unique customer identifier, wherein the unique customer identifier is associated with the mobile device; and
upon determining that the second count does not match the first count, generating a security notification related to the first grouping of products.

12. The system of claim 11, wherein the first set of item-specific identifiers comprises a concatenation of: (i) data values of one or more barcodes of the first grouping of products, and (ii) values of the first set of item-specific identifiers stored in the first set of RFD tags associated with the first grouping of products.

13. The system of claim 12, the operation further comprising:
deconstructing the first set of item-specific identifiers to identify the data values of one or more barcodes of the first grouping of products and the values of the first set of item-specific identifiers stored in the first set of RFID tags associated with the first grouping of products.

14. The system of claim 13, wherein the security notification is generated while the first set of RFID tags is active and without having to remove and disable the first set of RFID tags subsequent to the first purchase transaction of the first grouping of products.

15. The system of claim 12, the operation further comprising prior to receiving the first set of item-specific identifiers:
associating the first set of RFID tags with the first grouping of products:
storing the first set of item-specific identifiers of the first grouping of products in the first set of RFID tags; and
storing an indication in the data store that the first grouping of products has not been purchased.

16. The method of claim 1, further comprising:
receiving a data space customizing at least one of the data values of one or more barcodes and the first set of item-specific identifiers.

17. The computer program product of claim 6, receiving a data space customizing at least one of the data values of one or more barcodes and the first set of item-specific identifiers.

* * * * *

UNITED STATES PATENT AND TRADEMARK OFFICE
CERTIFICATE OF CORRECTION

PATENT NO. : 10,460,303 B2  
APPLICATION NO. : 15/283080  
DATED : October 29, 2019  
INVENTOR(S) : Mangesh B. Patil et al.

Page 1 of 1

It is certified that error appears in the above-identified patent and that said Letters Patent is hereby corrected as shown below:

In the Claims

In Column 15, Line 64, in Claim 3, delete "RFC" and insert -- RFID --, therefor.

In Column 15, Line 67, in Claim 4, delete "RFD" and insert -- RFID --, therefor.

In Column 17, Line 21, in Claim 11, delete "identifier" and insert -- identifier, --, therefor.

In Column 17, Line 41, in Claim 11, after "wherein" delete "the".

In Column 18, Line 11, in Claim 12, delete "RFD" and insert -- RFID --, therefor.

In Column 18, Line 31, in Claim 15, delete "products:" and insert -- products; --, therefor.

Signed and Sealed this  
Thirty-first Day of December, 2019

Andrei Iancu  
*Director of the United States Patent and Trademark Office*